United States Patent
Arashi et al.

(10) Patent No.: US 10,254,525 B2
(45) Date of Patent: Apr. 9, 2019

(54) PHASE CONTRAST MICROSCOPE

(71) Applicant: OLYMPUS CORPORATION, Shibuya-ku, Tokyo (JP)

(72) Inventors: Bunryu Arashi, Hachioji (JP); Hiroshi Ishiwata, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 67 days.

(21) Appl. No.: 14/980,002

(22) Filed: Dec. 28, 2015

(65) Prior Publication Data
US 2016/0187635 A1    Jun. 30, 2016

(30) Foreign Application Priority Data
Dec. 24, 2014    (JP) .................................. 2014-260055

(51) Int. Cl.
*G02B 21/06* (2006.01)
*G02B 21/00* (2006.01)
*G02B 21/14* (2006.01)

(52) U.S. Cl.
CPC ......... *G02B 21/14* (2013.01); *G02B 21/0032* (2013.01); *G02B 21/06* (2013.01)

(58) Field of Classification Search
CPC ................ G02B 21/00; G02B 21/0016; G02B 21/0068; G02B 21/0092; G02B 21/02; G02B 21/025; G02B 21/06; G02B 21/14
See application file for complete search history.

(56) References Cited

U.S. PATENT DOCUMENTS

| | | | | |
|---|---|---|---|---|
| 5,571,475 A * | 11/1996 | Weber | ................ | C21B 13/002 266/185 |
| 5,751,475 A * | 5/1998 | Ishiwata | ................ | G02B 21/14 359/371 |
| 5,969,853 A * | 10/1999 | Takaoka | ................ | G02B 21/14 359/370 |
| 7,564,622 B2 * | 7/2009 | Ishiwata | ................ | G02B 21/14 359/368 |

(Continued)

FOREIGN PATENT DOCUMENTS

| JP | 06059818 U | 8/1994 |
|---|---|---|
| JP | 07225341 A | 8/1995 |

(Continued)

OTHER PUBLICATIONS

Japanese Office Action dated Apr. 25, 2018 issued in counterpart Japanese Application No. 2014-260055.

*Primary Examiner* — Thong Q Nguyen
(74) *Attorney, Agent, or Firm* — Holtz, Holtz & Volek PC

(57) ABSTRACT

A phase contrast microscope includes a light source, an illumination optical system configured to irradiate an observation object with the light from the light source, and a magnifying optical system configured to magnify and project the observation object, the illumination optical system includes a ring slit, the magnifying optical system includes an objective provided with a phase film, the ring slit is disposed at a pupil position of the illumination optical system, the phase film is disposed at a position conjugate to the pupil position of the illumination optical system, and the following conditional expression (1) is satisfied:

$$r/I \leq 0.25 \qquad (1)$$

where
r is a central part radius of the phase film, and
I is a radius of a pupil of the objective.

6 Claims, 8 Drawing Sheets

(56) References Cited

U.S. PATENT DOCUMENTS

| | | | |
|---|---|---|---|
| 7,688,505 B2* | 3/2010 | Vodyanoy | G01N 21/6458 359/368 |
| 8,351,116 B2* | 1/2013 | Suenaga | G02B 21/14 359/370 |
| 2005/0168808 A1* | 8/2005 | Ishiwata | G02B 21/14 359/368 |
| 2009/0201580 A1 | 8/2009 | Ishiwata | |
| 2010/0053740 A1* | 3/2010 | Nishiwaki | G02B 21/0056 359/370 |
| 2017/0075097 A1 | 3/2017 | Dowaki et al. | |

FOREIGN PATENT DOCUMENTS

| | | |
|---|---|---|
| JP | 11084260 A | 3/1999 |
| JP | 2002090630 A | 3/2002 |
| JP | 2005173288 A | 6/2005 |
| JP | 2015219280 A | 12/2015 |

* cited by examiner

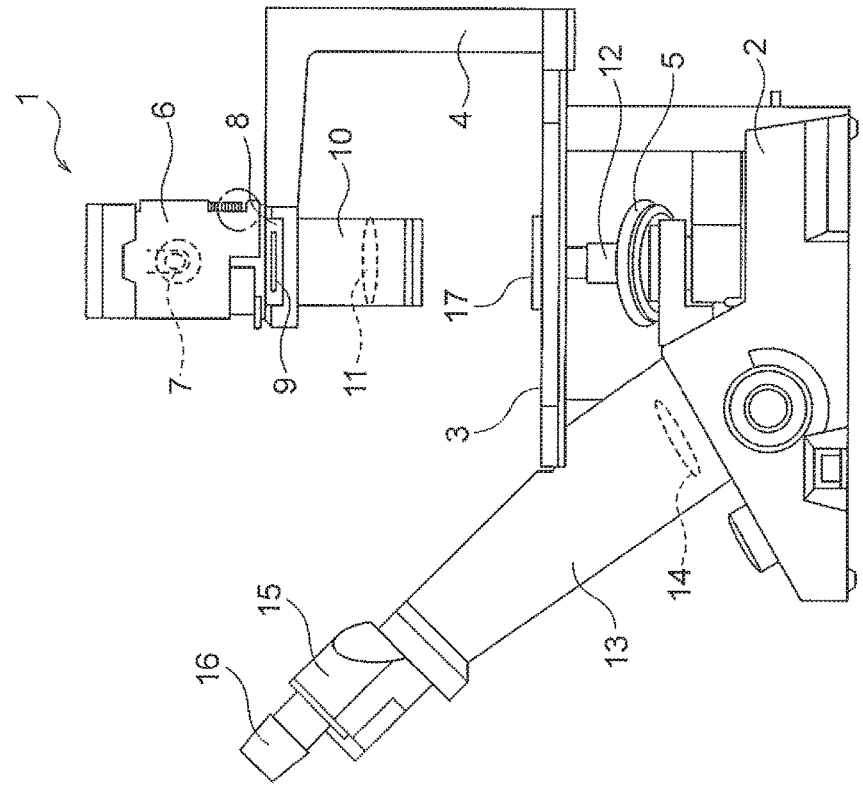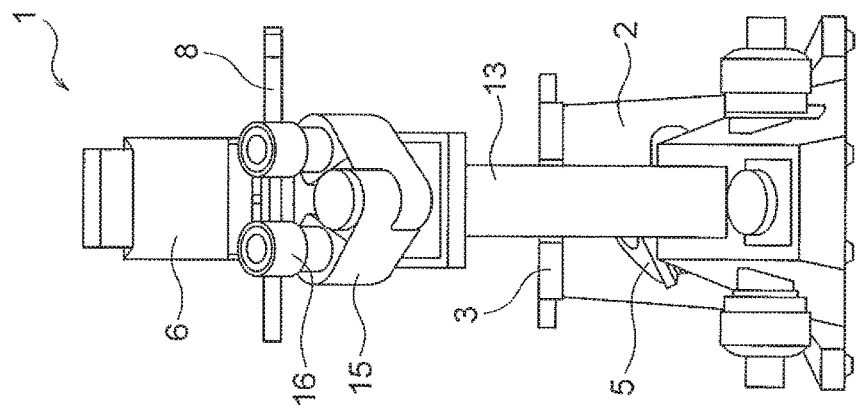

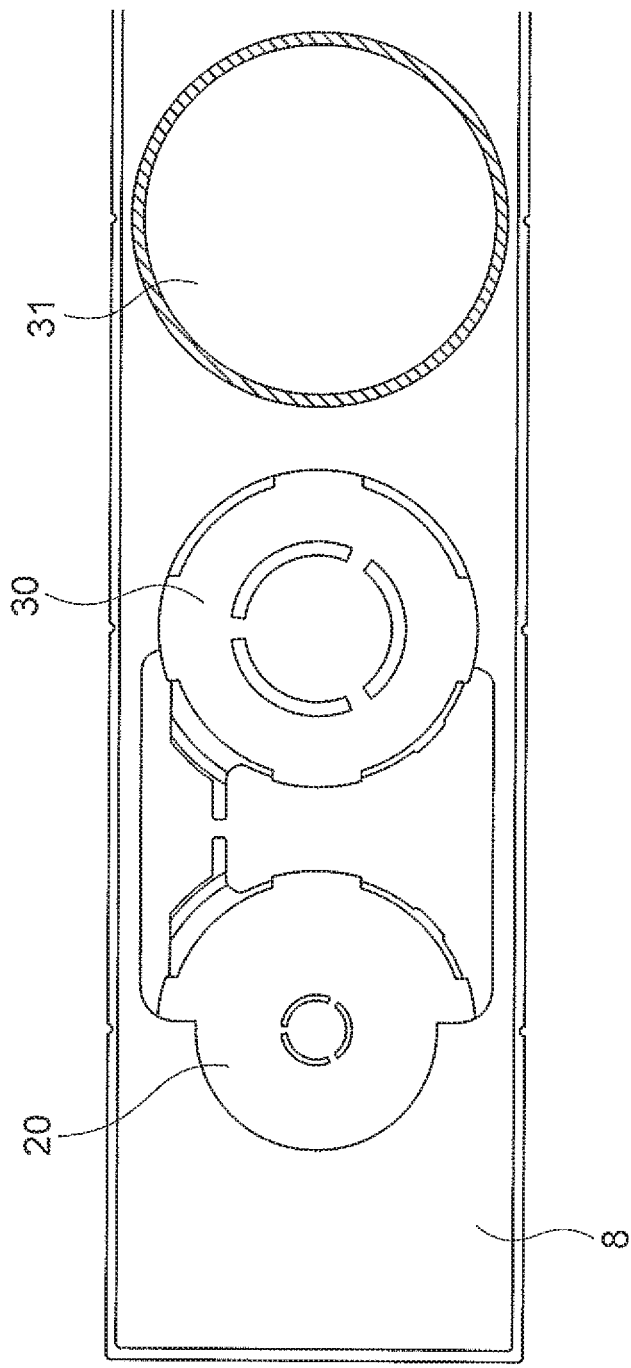

PHASE CONTRAST MICROSCOPE

CROSS-REFERENCE TO RELATED APPLICATION

The present application is based upon and claims the benefit of priority from the prior Japanese Patent Application No. 2014-260055 filed on Dec. 24, 2014; the entire contents of which are incorporated herein by reference.

BACKGROUND OF THE INVENTION

Field of the Invention

The present invention relates to a phase contrast microscope, specifically, a phase contrast microscope capable of obtaining a high-contrast phase contrast image even in the case where the thickness of a sample is thick.

Description of the Related Art

A phase contrast microscope is a microscope including a ring slit disposed at a pupil position in an illumination optical system (condenser lens) and an annular phase film disposed at a pupil position in an observation optical system (objective), and converting a phase distribution of a sample into an image contrast by making the ring slit and the phase film to be a conjugate relation.

An image formed with the phase contrast microscope is composed of a plurality of image components such as a bright-field component obtained by ordinary bright-field observation of the sample and the like, in addition to an image component proportional to the phase distribution of the sample. Furthermore, the composition ratio of these image components and the like change depending on the thickness and the shape of the sample.

In order to enhance the contrast of the image component proportional to the phase distribution of the sample, it is necessary to make a state such that the conjugate relation between the phase film in the objective and the ring slit in the condenser lens are maintained properly. Moreover, since the contrast of the image component proportional to the phase distribution changes depending on the radius and the film width of the annular phase film disposed in the objective, under the circumstances, it is preferable that the radius of the phase film is designed to be about half the radius of a pupil of the objective.

In an objective used in a typical phase contrast microscope, the radius of the phase film is designed to be about half the radius of the pupil of the objective so that the contrast of the phase contrast image at each magnification is substantially the same as that of another one. When the objective is exchanged for another objective suitable for a desired observation magnification in order to change observation magnification, a projected magnification, which is a magnification in the case where the ring slit in the condenser lens is projected on the pupil position of the objective, changes.

In order to perform the phase contrast observation, it is necessary to maintain the conjugate relation between the phase film and the ring slit, and thus, it is necessary to change the radius of the ring slit depending on the radius of annular phase film disposed in the objective for each magnification. For this reason, it is necessary to prepare ring slits corresponding to the respective magnifications of objectives in advance.

The phase contrast microscope is, for example, used for observing the development of cultured cells. The development of the cultured cells is observed in accordance with a predetermined procedure in which observation magnification and the like are often changed. In such an observation, work efficiency is reduced if a ring slit is changed to another one corresponding to an objective to be used. To address the problem, a microscope capable of phase contrast observation using a common ring slit has been disclosed in Japanese Patent Application Publication Raid-open No. 11-084260.

The phase contrast microscope disclosed in Japanese Patent Application Publication Raid-open No. 11-084260 is configured to enable phase contrast observation using the same ring slit even if magnifications of the objectives to be used are different. In the phase contrast microscope, by making the radius of the common ring slit and the radius of the pupil of each objective to satisfy a certain condition, the change in the contrast of the image component proportional to the phase distribution, which is produced by changing the magnification of the objective, is reduced.

Here, a state in which the position of the sample coincides with the in-focus position of the objective is called a in-focus state (hereinafter referred to as the "in-focus state"), and a state in which the position of the sample does not coincide with the in-focus position of the objective is called a defocus state (hereinafter referred to as the "defocus state").

When the sample is a colorless and transparent phase object with phase distribution, the contrast of the image component proportional to the phase distribution is not generated under the in-focus state in the bright-field observation of the sample. Therefore, the phase contrast observation or the like is used for observing such a phase object. However, when the sample is moved from the in-focus state to the defocus state (defocused) and is observed under the defocus state, the contrast of the image component proportional to the phase distribution is generated. This image contrast is generated such that the wavefront aberration generated by defocusing acts on the phase distribution of the sample as a phase film of a phase contrast microscope. An image of the phase object generated due to an interaction of the phase distribution and the wavefront aberration by defocusing is called an interaction image (hereinafter referred to as the "interaction image").

A microscope used for observing cultured cells using such an interaction image has been disclosed in Japanese Patent Application Publication Raid-open No. 2005-173288.

An image of the sample formed by the phase contrast microscope is composed of a phase contrast image component proportional to the phase distribution of the sample and an image component obtained by observing a phase object in bright-field observation is described. In the case where the sample is placed in the defocus state, since the interaction image overlaps with the image component proportional to the phase distribution, contrast of the phase contrast image decreases.

Moreover, since the sample is placed in the defocus state, the image component proportional to the phase distribution also becomes a phase contrast image having blur due to an affection of defocusing. In this case, since a contrast of the image component proportional to the phase distribution decreases, contrast of the image observed by the phase contrast microscope further decreases.

As described above, the cultured cells are available as an observation object for the phase contrast microscope. Conventional cultured cells are cells in which the thickness is thin (hereinafter referred to as the "thin cells"). At the thin cells, if the top surface of the cells is focused, the entire cells from the top surface to the bottom surface are in a substantially in-focus state. At the thin cells, the interaction image is not generated.

As just described, at the thin cells, a formed image is composed of only the image component proportional to the phase distribution at any position from the top surface to the bottom surface. Therefore, in the case where the thickness of the sample is thin, a high-contrast phase contrast image can be obtained in the phase contrast microscope disclosed in Japanese Patent Application Publication Raid-open No. 11-084260.

SUMMARY OF THE INVENTION

A phase contrast microscope according to the present invention comprises:
a light source;
an illumination optical system configured to irradiate an observation object with the light from the light source; and
a magnifying optical system configured to magnify and project the observation object, wherein
the illumination optical system includes a ring slit,
the magnifying optical system includes an objective provided with a phase film,
the ring slit is disposed at a pupil position of the illumination optical system,
the phase film is disposed at a position conjugate to the pupil position of the illumination optical system, and
the following conditional expression (1) is satisfied:

$$r/I \leq 0.25 \quad (1)$$

where
r is a central part radius of the phase film, and
I is a radius of a pupil of the objective.

Another phase contrast microscope according to the present invention comprises:
a light source;
an illumination optical system configured to irradiate an observation object with the light from the light source; and
a magnifying optical system configured to magnify and project the observation object, wherein
the illumination optical system includes a ring slit,
the magnifying optical system includes a phase film,
the ring slit is disposed at a pupil position of the illumination optical system,
the phase film is disposed at a position conjugate to the pupil position of the illumination optical system, and
the following conditional expression (2) is satisfied:

$$\beta \times R/I \leq 0.25 \quad (2)$$

where
$\beta$ is a magnification in projecting the ring slit to the position of the phase film,
R is a central part radius of the ring slit, and
I is a radius of a pupil of the objective.

BRIEF DESCRIPTION OF THE DRAWINGS

FIGS. 1A and 1B are diagrams showing an appearance of a phase contrast microscope, where
FIG. 1A is a front view and FIG. 1B is a side view;
FIG. 3A is a diagram showing an image of the aperture portion formed by non-diffraction light and the phase film,
FIG. 3B is a diagram showing an image of the aperture portion formed by diffraction light and the phase film,
and FIG. 3C is a diagram showing two regions in the image of the aperture portion formed by diffraction light;

FIG. 6A is a diagram when $r_c$=0.25, $\Delta$=0.5$\delta$,
FIG. 6B is a diagram when $r_c$=0.45, $\Delta$=0.5$\delta$,
FIG. 6C is a diagram when $r_c$=0.25, $\Delta$=0.75$\delta$,
FIG. 6D is a diagram when $r_c$=0.45, $\Delta$=0.75$\delta$,
FIG. 6E is a diagram when $r_c$=0.25, $\Delta$=$\delta$,
FIG. 6F is a diagram when $r_c$=0.45, $\Delta$=$\delta$;
FIG. 8 is a diagram showing a holder.

DETAILED DESCRIPTION OF THE PREFERRED EMBODIMENTS

Figure 2:
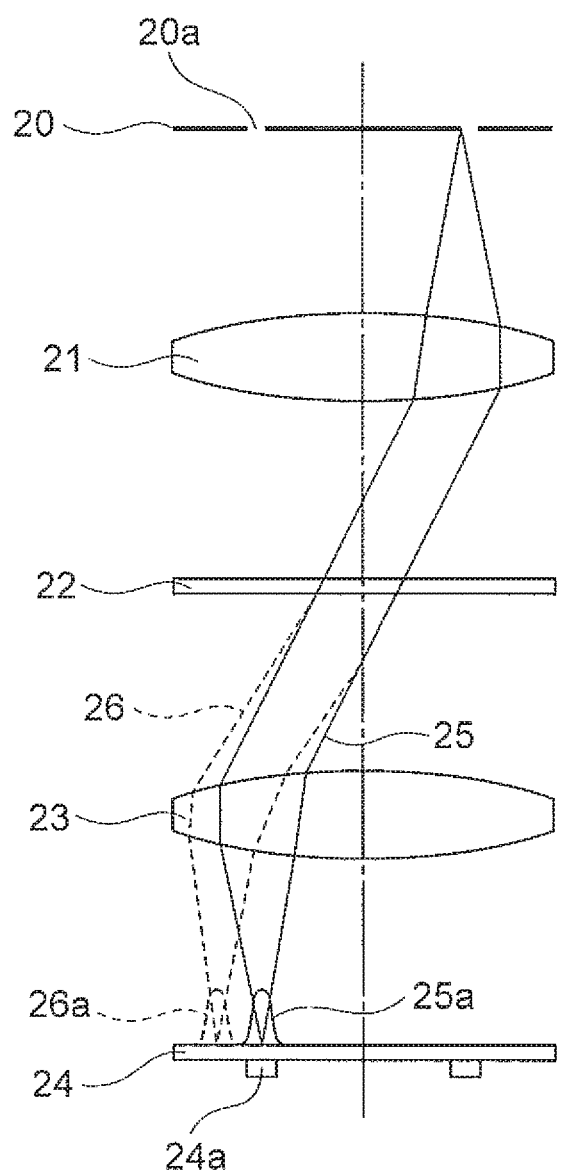
FIG. 2 is a diagram showing a structure of an optical system for phase contrast observation.

The iPS cells are available as the cultured cells in which research is actively advanced recently. At the iPS cells, since each cell itself is thick and forms aggregate of cells, called colony, with other cells, the iPS cells are cells in which thickness is thick (hereinafter referred to as the "thick cells") as a whole. At the thick cells, since cells locate in front and behind of an observed cell, if the top surface of a specific cell is focused, these cells are in the defocus state. Therefore, at the thick cells, the interaction images of the cells which locate in front and behind of the in-focus position are generated.

In this case, an image of the surface of cell is composed of the image component proportional to the phase distribution, but images of the cells which locate in front and behind of observed cell are composed of the phase contrast image having blur and the interaction image. Therefore, observation image of the thick cell becomes an image such that a blurred phase contrast image of a cell at defocus position and the interaction image overlap on a phase contrast image of a cell at in-focus position.

The present invention has been accomplished in view of the foregoing, and it is possible to provide a phase contrast microscope capable of obtaining a high-contrast phase contrast image even in the case where the thickness of the sample is thick.

Exemplary embodiments of a scanning optical microscope according to the present invention will be described below by referring to the accompanying diagrams. However, the present invention is not restricted to the embodiments described below.

A phase contrast microscope according to a first embodiment includes a light source, an illumination optical system configured to irradiate an observation object with the light from the light source, and a magnifying optical system configured to magnify and project the observation object, the illumination optical system includes a ring slit, the magnifying optical system includes an objective provided with a phase film, the ring slit is disposed at a pupil position of the illumination optical system, the phase film is disposed at a position conjugate to the pupil position of the illumination optical system, and the following expression (1) is satisfied:

$$r/I \leq 0.25 \quad (1)$$

where
r is a central part radius of the phase film, and
I is a radius of a pupil of the objective.

FIGS. 1A and 1B are diagrams showing an appearance of a phase contrast microscope, where FIG. 1A is a front view and FIG. 1B is a side view. A microscope 1 includes a microscope body 2, a sample mounting stage 3, an illumination pillar 4, and a revolver 5.

The sample mounting stage 3 is supported on the microscope body 2. A lamp house 6, a slider 8, and a condenser barrel 10 are disposed above the sample mounting stage 3. The slider 8 is disposed between the lamp house 6 and the condenser barrel 10. The lamp house 6, the slider 8, and the condenser barrel 10 are supported via the illumination pillar 4.

A light source 7 is disposed in the lamp house 6. An aperture element 9 is disposed in the slider 8. A condenser lens 11 is disposed in the condenser barrel 10. As the aperture element 9, for example, an aperture or a ring slit is available. At the aperture, a shape of an aperture portion is circular. At the ring slit, a shape of an aperture portion is annular. The circular aperture is used in bright-field observation and the ring slit is used in phase contrast observation.

The revolver 5 is disposed under the sample mounting stage 3. An objective 12 is mounted on the revolver 5. A plurality of objectives is mountable on the revolver 5. The objectives are easily exchanged by rotating the revolver 5.

The microscope body 2 includes a lens barrel 13. In the lens barrel 13, an imaging lens 14 is disposed. In addition, an observation lens barrel 15 is connected to the lens barrel 13. An eyepiece 16 is mounted on the observation lens barrel 15.

The light source 7 emits illumination light. The illumination light passes through the aperture element 9, and enters the condenser lens 11. The illumination light reaches the sample mounting stage 3 through the condenser lens 11. A sample 17 is mounted on the sample mounting stage 3. The sample 17 is irradiated with the illumination light. Thus, the condenser lens 11 is an optical member included in the illumination optical system.

The light from the sample 17 enters the objective 12 and is condensed by the imaging lens 14. The image of the sample 17 is formed at the position to which the light is condensed. The image of the sample 17 is an image magnified with the objective 12 and the imaging lens 14. Thus, the objective 12 is an optical member included in the magnifying optical system.

The image of the sample 17 can be observed with the eyepiece 16 through the observation lens barrel 15. When the phase contrast observation is performed with the microscope 1, a ring slit is used as the aperture element 9 and an objective for phase contrast is used as the objective 12.

An optical system for phase contrast observation is described. FIG. 2 is a diagram showing a structure of the optical system for phase contrast observation. A ring slit 20 has an annular aperture portion 20a. The ring slit 20 is disposed at a focal position of the condenser lens 21. The focal position of the condenser lens 21 is the same as the pupil position of the illumination optical system. Therefore, the ring slit 20 is disposed at the pupil position of the illumination optical system. The center of the annulus, that is, the center of the aperture portion 20a is positioned on the optical axis of the illumination optical system.

An objective 23 for phase contrast is disposed at a position opposing to the condenser lens with the sample 22 interposed therebetween. The objective 23 for phase contrast includes a phase plate 24. The phase film 24a is formed into annular on the phase plate 24. The phase film 24a is disposed at a focal position of the objective 23 for phase contrast. The focal position of the objective 23 for phase contrast is conjugate to the position of the ring slit 20, that is, the pupil position of the illumination optical system. Therefore, the phase film 24a is disposed at a position conjugate to the pupil position of the illumination optical system.

Moreover, the focal position of the objective 23 for phase contrast is the same as the pupil position of the magnifying optical system. Consequently, the phase film 24a is considered to be disposed at the pupil position of the magnifying optical system. The center of the annulus, that is, the center of the phase film 24a is positioned on the optical axis of the magnifying optical system.

In the phase contrast microscope according to the present embodiment, the pupil position of the illumination optical system is relayed to the pupil position of the objective. Consequently, the ring slit 20 and the phase film 24a are disposed at the pupil positions of an optical system. However, since aberration is generated by the optical system, the image position of the pupil of the illumination optical system and the pupil position of the objective do not necessarily coincide with each other. Therefore, the ring slit 20 and the phase film 24a may be disposed near the pupil position. The same applies to the case where the ring slit 20 and the phase film 24a are disposed at the positions conjugate to the pupil position of the optical system.

The sample 22 is irradiated with the illumination light passed through the aperture portion 20a through the condenser lens 21. Non-diffraction light and diffraction light is generated from the sample 22. As the diffraction light, there are positive first order diffraction light and negative first order diffraction light. In addition, further higher-order diffraction light can be generated. FIG. 2 indicates only the positive first order diffraction light with broken lines.

Non-diffraction light 25 travels in the direction same as the incident direction of the illumination light. The non-diffraction light 25 enters the objective 23 for phase contrast and is condensed on the phase plate 24. At the light-condensing position, an image 25a of the aperture portion 20a is formed by the non-diffraction light 25. The image 25a is an annular image, and the center of an annulus coincides with the optical axis. Meanwhile, the phase film 24a is also annular, and the center of an annulus coincides with the optical axis. Consequently, with respect to the non-diffraction light 25, the centers of the image 25a and the phase film 24a coincides with each other.

Positive first order diffraction light 26 (hereinafter referred to as the "diffraction light") travels in a direction different from the incident direction of the illumination light. The diffraction light 26 enters the objective 23 for phase contrast and is condensed on the phase plate 24. At the light-condensing position, an image 26a of the aperture portion 20a is formed by the diffraction light 26. The image 26a is an annular image, but the center of an annulus does not coincide with the optical axis. Consequently, with respect to the diffraction light 26, the centers of the image 26a and the phase film 24a do not coincide with each other.

Figure 3A:
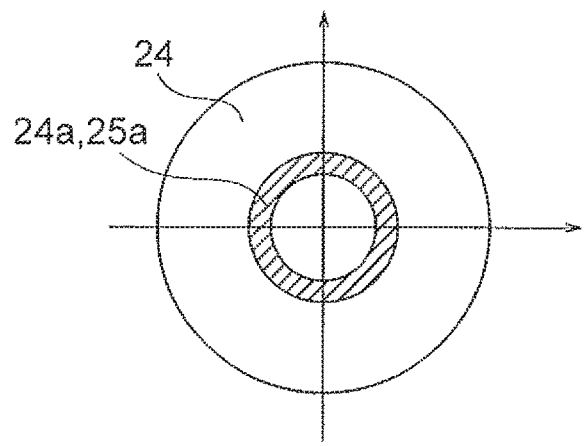
FIGS. 3A, 3B, and 3C are diagrams showing a phase film and an image of an aperture portion, where
Figure 3B:
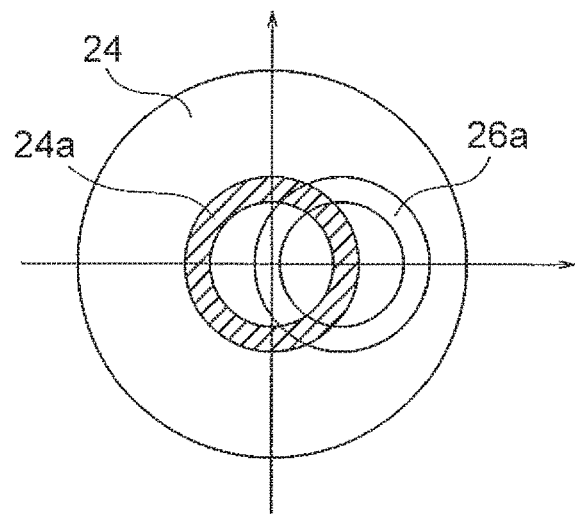
Figure 3C:
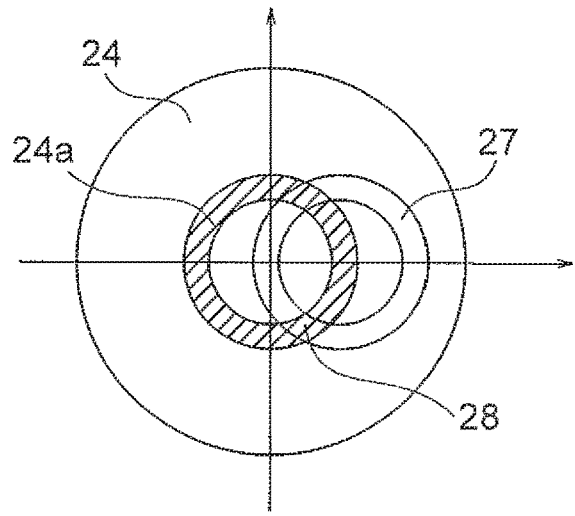

A relation between a phase film and an image of an aperture portion is described. FIGS. 3A, 3B, and 3C are diagrams showing a phase film and an image of an aperture portion, where FIG. 3A is a diagram showing an image of the aperture portion formed by non-diffraction light and the phase film, FIG. 3B is a diagram showing an image of the aperture portion formed by diffraction light and the phase film, and FIG. 3C is a diagram showing two regions in the image of the aperture portion formed by the diffraction light.

As described above, with regard to the non-diffraction light 25, the centers of the image 25a and the phase film 24a coincide with each other. In this case, as shown in FIG. 3A, the phase film 24a and the image 25a are overlapped. The non-diffraction light 25, after passing through the phase film 24a, is condensed by the imaging lens. The light-condensing position is conjugate to the sample 22. Therefore, an image obtained by the non-diffraction light 25 is formed at the position conjugate to the sample 22. This image represents a background component. The brightness of the background component is represented as the product of the brightness of the non-diffraction light and the transmittance of the phase film 24a.

With regard to the diffraction light 26, the centers of the image 26a and the phase film 24a do not coincide with each other. In this case, as shown in FIG. 3B, the image 26a is displaced with respect to the phase film 24a. Moreover, as shown in FIG. 3C, the image 26a is divided into regions 27 and 28. In the regions 27, the phase film 24a and the image 26a are not overlapped. In the regions 28, the phase film 24a and the image 26a are overlapped.

The diffraction light 26 passed through the regions 27 is condensed by the imaging lens. With this configuration, an image, which is formed by an interference between the diffraction light 26 passed through the regions 27 and the non-diffraction light 25, is formed at the position conjugate to the sample 22. Since this image includes a phase change by the phase film, this image includes phase distribution information of the sample.

Also, the diffraction light 26 passed through the regions 28 is condensed by the imaging lens. With this configuration, an image, which is formed by an interference between the diffraction light 26 passed through the regions 28 and the non-diffraction light 25, is formed at the position conjugate to the sample 22. This image formed by the diffraction light 26. However, since the diffraction light 26 passes through the phase film 24a, this image includes a phase change same as in the case of the non-diffraction light 25. Therefore, since no substantial effect of the phase film is included, this image becomes an image composed of a bright-field component. In the bright-field component of a phase object, the wavefront aberration by defocusing does not act on the phase distribution under the in-focus state, but the wavefront aberration by defocusing acts on the phase distribution under the defocus state.

As described above, a background component, phase distribution information of a sample (an image component proportional to the phase distribution), and bright-field image component are included in a phase contrast image. When the sample 22 is a phase object, since the wavefront aberration by defocusing does not act on the phase distribution under the in-focus state, the bright-field image component is zero. However, since the wavefront aberration by defocusing acts on the phase distribution under the defocus state, the bright-field image component is not zero and the image contrast is generated as an interaction image.

When the sample 22 is thin cells, if the top surface of the cells is focused, the entire cells from the top surface to the bottom surface are in a substantially in-focus state. In this case, since an interaction image is not generated, the phase contrast image of the sample 22 is formed on the basis of the background component and the phase distribution information of the sample. Consequently, a high-contrast phase contrast image can be obtained.

In contrast, when the sample 22 is thick cells such as an iPS cell, since each cell itself is thick and forms aggregate of cells with other cells, and therefore, the iPS cells are cells in which the thickness is thick as a whole. For this reason, if the top surface of a specific cell is focused, the internal structure of the cell apart from the in-focus position and other cells locate in front and behind of the in-focus position are in the defocus state. In this case, the interaction images of the parts in the defocus state are generated. Thus, the phase contrast image of the sample 22 is formed in the form that the interaction image overlaps with the background component and the phase distribution information of the sample. As a result, the contrast of the phase contrast image is reduced.

Here, in the phase contrast microscope according to the present embodiment, the above-mentioned conditional expression (1) is satisfied. Thus, even in the case where the thickness of the sample is thick, in the phase contrast microscope according to the present embodiment, a high-contrast phase contrast image can be obtained.

Figure 4:
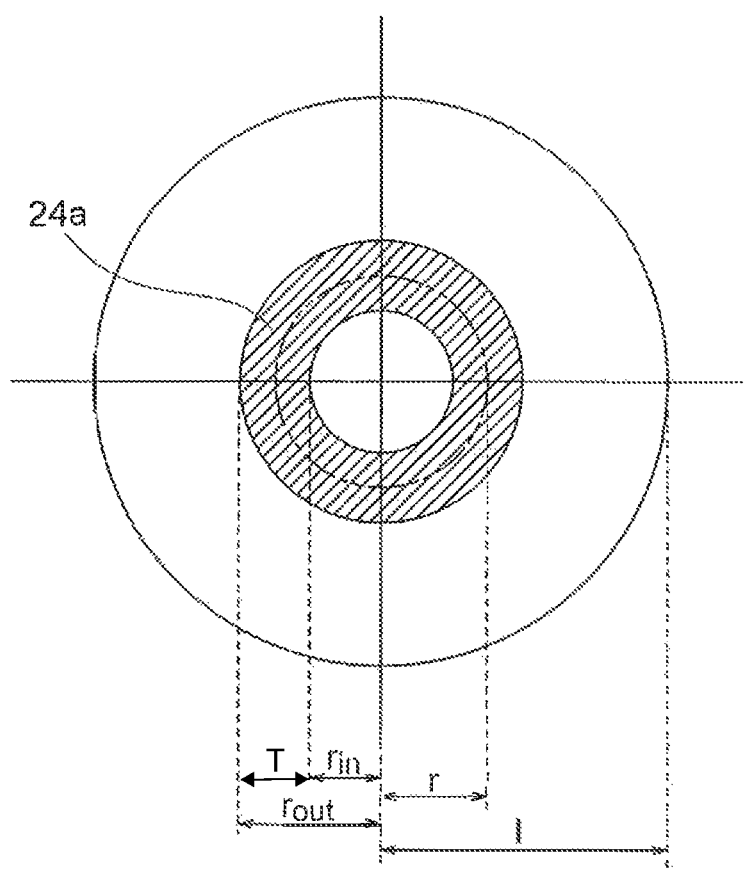
FIG. 4 is a diagram showing a central part radius of the phase film and a radius of a pupil of an objective.

Conditional expression (1) is a conditional expression of the ratio between the central part radius of the phase film and the radius of the pupil of the objective. FIG. 4 is a diagram showing a central part radius of the phase film and a radius of a pupil of an objective. The phase film 24a is placed at the pupil position of the objective. The central part radius r of the phase film 24a is represented by the following expression (A):

$$r=(r_{in}+r_{out})/2 \qquad (A)$$

where $r_{in}$ is an inner radius of the phase film 24a, and $r_{out}$ is an outer radius of the phase film 24a.

When exceeding an upper limit value of conditional expression (1), the generation amount of interaction image becomes large. Therefore, it becomes difficult to obtain a high-contrast phase contrast image in the case where the thickness of the sample is thick.

In the case of thick cells such as an iPS cells, internal structures of the cells locate at a position apart from the in-focus position, and cells locate in front and behind of the in-focus position. Thus, the light from the internal structures of the cells and the light from the cells locate in front and behind of the in-focus position enter the objective. As disclosed in Japanese Patent Application Publication Raid-open No. 2005-173288, when light from a position defocused from the in-focus position of the objective enters the objective, wavefront aberration corresponding to a defocus amount Δ is generated in the pupil plane of the objective.

Figure 5:
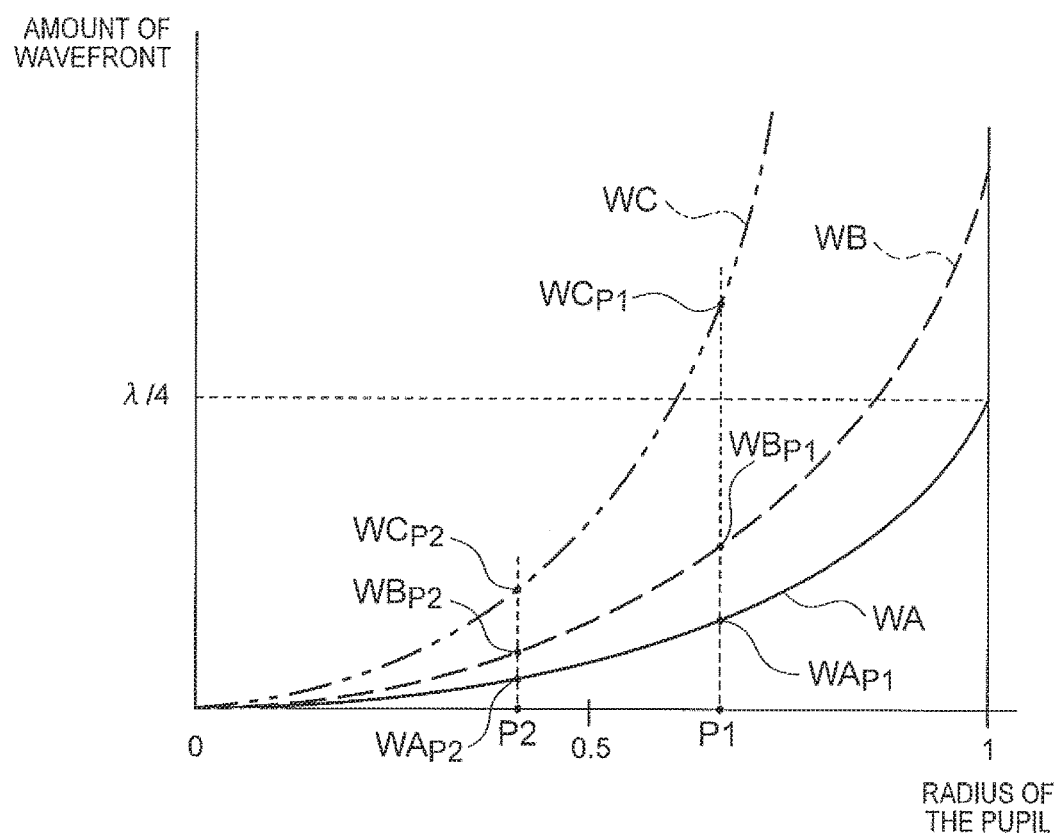
FIG. 5 is a diagram showing a relation between a defocus amount $\Delta$ and wavefront aberration in a pupil plane with a coordinate system obtained by normalizing the radius of the pupil of the objective to one.

FIG. 5 is a diagram showing a relation between a defocus amount Δ and wavefront aberration in a pupil plane with a coordinate system obtained by normalizing the radius of the pupil of the objective to one. The position P1 represents a position apart from the center of the pupil and the position P2 represents a position near the center.

In the case of a thick sample, light from cells at positions defocused from the in-focus position of the objective enters the objective. In this situation, as disclosed in Japanese Patent Application Publication Raid-open No. 2005-173288, the wavefront aberration at the pupil plane of the objective changes depending on the defocus amount Δ from the in-focus position of the objective (hereinafter referred to as the "defocus amount Δ").

The wavefront aberrations (hereinafter referred to as the "wavefront") produced in the pupil of the objective when the defocus amounts are ΔA, ΔB, and ΔC are represented as a wavefront WA, a wavefront WB, and a wavefront WC, respectively.

When the defocus amounts Δ have the following relation:

$$\Delta A < \Delta B < \Delta C$$

according to Japanese Patent Application Publication Raid-open No. 2005-173288, there is the following relation:

wavefront WA<wavefront WB<wavefront WC.

Comparison of the values of wavefront at the respective coordinate positions in the pupil of the objective (hereinafter referred to as the "amount of wavefront") for the wavefront WA, the wavefront WB, and the wavefront WC, shows that the amount of wavefront at the position 21 and the amount of wavefront at the position P2 have the following relations:

$WA_{P1} < WB_{P1} < WC_{P1}$, and $WA_{P2} < WB_{P2} < WC_{P2}$.

As described above, at any position except the center of the pupil of the objective, the wavefront becomes large as the defocus amount Δ becomes large.

In contrast, comparison at the same wavefront shows that the amounts of wavefront at the position P1 and the position P2 are represented as follows:

$WA_{P1} > WA_{P2}$, $WB_{P1} > WB_{P2}$, and $WC_{P1} > WC_{P2}$.

As described above, the amount of wavefront at the position P1 is larger than that at the position P2 in any defocus amount Δ.

The defocus amount Δ and the generation amount of interaction image have a proportional relation as described above. Moreover, as shown in FIG. 5, the defocus amount Δ and the amount of wavefront have a proportional relation. Consequently, a proportional relation is established between the amount of wavefront and the generation amount of interaction image.

For this reason, by reducing the amount of wavefront, it is possible to reduce the generation amount of interaction picture. As found in the comparison of the amounts of wavefront at the position P1 and the position P2, the amount of wavefront becomes smaller toward the center of the pupil of the objective. Hence, in order to reduce the generation amount of interaction image, it is preferable to use the light near the center of the pupil of the objective for imaging.

The diffraction light passed through the regions 28 generates an interaction image. Thus, in order to reduce the generation amount of interaction image, it is preferable to move the regions 28 closer to the center of the pupil of the objective.

The regions 28 are regions where the phase film 24a and the image 26a are overlapped. The image 26a is an image formed by the diffraction light. Since the diffraction direction of diffraction light depends on a sample, the position of the image 26a cannot be changed freely. In contrast, the position of the phase film 24a can be changed freely. Thus, in order to reduce the generation amount of interaction image, it is preferable to move the position of the phase film 24a closer to the center of the pupil of the objective.

The amount of interaction image can be calculated by a simulation. An interaction image can be represented by the following expression (B):

$$I(x, \text{def}) = \int_{-\infty}^{\infty} 2 \text{MTF}(f) \cdot \sin\{\text{ptf}(f, \text{def})\} \cdot \Phi(f) \exp(-2\pi i f x) df \quad (B)$$

where

MTF(f) is a modulation transfer function of the optical system, ptf(f) is a phase transfer function of the optical system, and Φ(f) is a Fourier transformation of phase distribution of a sample (phase object).

Figure 6A:
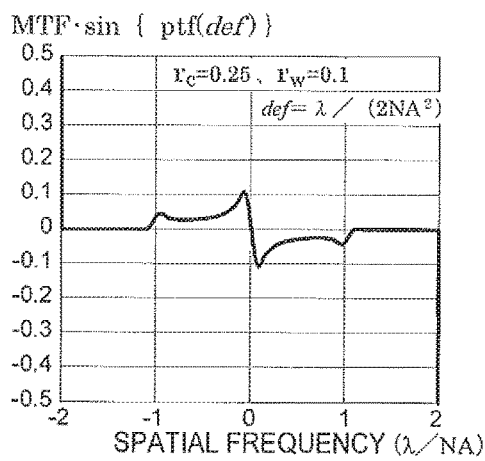
FIGS. 6A, 6B, 6C, 6D, 6E, and 6F are diagrams showing a generation amount of interaction image obtained by a simulation.
Figure 6B:
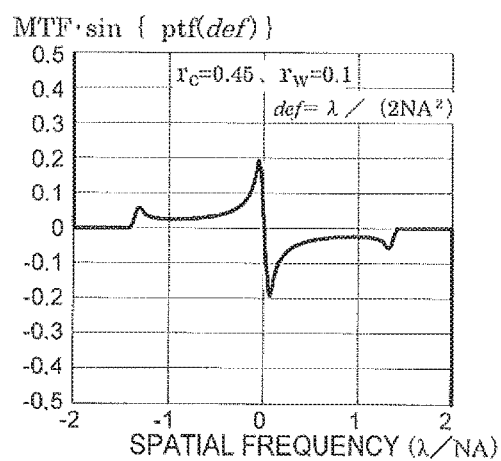
Figure 6C:
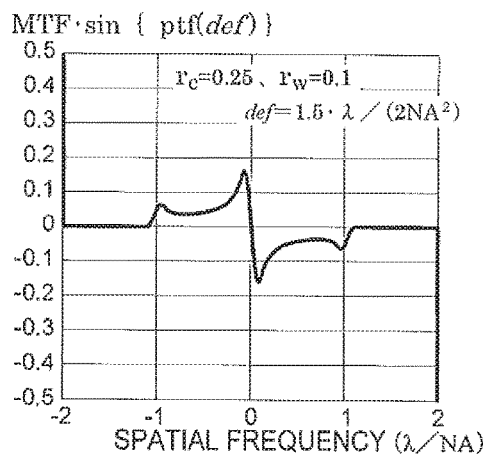
Figure 6D:
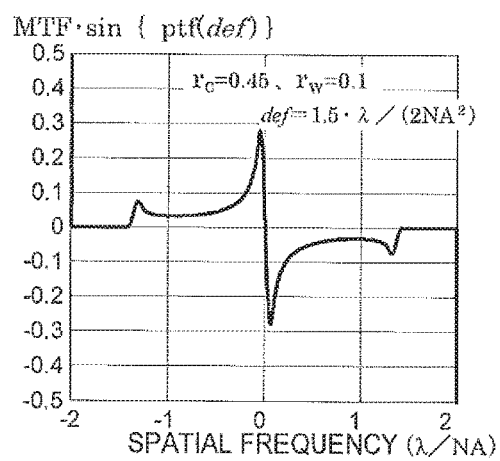
Figure 6E:
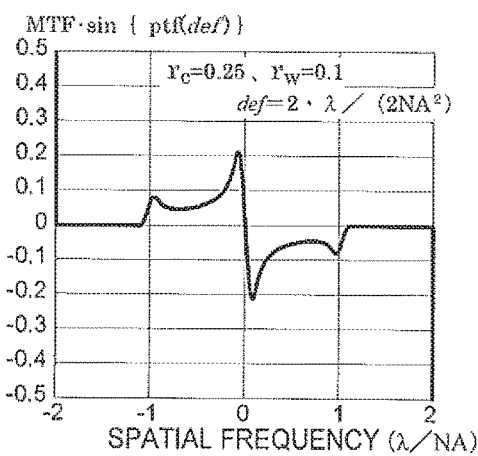
Figure 6F:
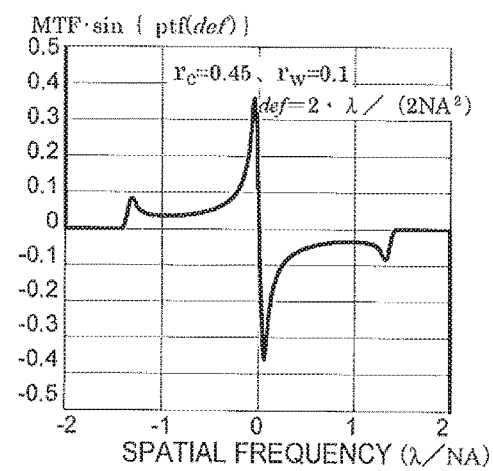

The generation amounts of interaction image obtained by the simulation are shown in FIGS. 6A, 6B, 6C, 6D, 6E, and 6F. In FIG. 6, FIG. 6A is a diagram when $r_c = 0.25$, $\Delta = 0.5\delta$, FIG. 6B is a diagram when $r_c = 0.45$, $\Delta = 0.5\delta$, FIG. 6C is a diagram when $r_c = 0.25$, $\Delta = 0.75\delta$, FIG. 6D is a diagram when $r_c = 0.45$, $\Delta = 0.75\delta$, FIG. 6E is a diagram when $r_c = 0.25$, $\Delta = \delta$, FIG. 6F is a diagram when $r_c = 0.45$, $\Delta = \delta$, where δ is a depth of focus and represented as $\delta = \lambda/NA^2$, λ is a wavelength, and NA is the number of object-side apertures of the optical system.

In FIGS. 6A, 6B, 6C, 6D, 6E, and 6F, MTF·sin{ptf(def)} in the longitudinal axis represent the generation amount of interaction image. $r_c$ is the radius obtained by normalizing the central part radius r of the phase film with the radius I of the pupil of the objective. $r_w$ is a width of the normalized phase film.

FIG. 6A and FIG. 6B each represent a case where the defocus amount Δ is 0.5 times the depth of focus of the optical system. Comparison of FIG. 6A and FIG. 6B shows that the phase film in FIG. 6A is closer to the center of the pupil of the objective than that in FIG. 6B. In addition, the generation amount of interaction image in FIG. 6A is smaller than that in FIG. 6B.

FIG. 6C and FIG. 6D each represent a case where the defocus amount Δ is 0.75 times the depth of focus of the optical system. Comparison of FIG. 6C and FIG. 6D shows that the phase film in FIG. 6C is closer to the center of the pupil of the objective than that in FIG. 6D. In addition, the generation amount of interaction image in FIG. 6C is smaller than that in FIG. 6D.

FIG. 6E and FIG. 6F each represent a case where the defocus amount Δ is the same as the depth of focus of the optical system. Comparison of FIG. 6E and FIG. 6F shows that the phase film in FIG. 6E is closer to the center of the pupil of the objective than that in FIG. 6F. In addition, the generation amount of interaction image in FIG. 6E is smaller than that in FIG. 6F.

As described above, when the phase film is closer to the center of the pupil of the objective (FIG. 6A, FIG. 6C, and FIG. 6E), generation amount of interaction image is smaller than that in the case where the phase film is far from the center of the pupil of the objective (FIG. 6B, FIG. 6D, and FIG. 6F), at any defocus amount Δ.

As the result of the simulation shows, in order to reduce the generation amount of interaction image, it is preferable to locate the phase film closer to the center of the pupil of the objective.

Moreover, in FIG. 6E and in FIG. 6B, the generation amount of interaction image is substantially the same. However, the defocus amount Δ in FIG. 6E is equal to the depth of focus of the optical system, but that in FIG. 6B is half the depth of focus of the optical system. Under the assumption that the generation amount of interaction image in FIG. 6B is acceptable, in FIG. 6E, it becomes possible to accept up to about twice the defocus range between the position of the sample and the in-focus position of the objective as compared to in FIG. 6B.

The amount of deviation Δ in FIG. 6B is represented by $\lambda/2NA^2$. Consequently, the acceptable range of the generation amount of interaction image is the range of $\lambda/2NA^2$ from the in-focus position to each of both sides of the in-focus position. $\lambda/2NA^2$ is the depth of focus of the optical system. Therefore, in FIG. 6B, a high-contrast phase contrast image can be obtained when the sample has a thickness equal to or smaller than the depth of focus. In contrast, a high-contrast phase contrast image cannot be obtained when the sample has a thickness larger than the depth of focus.

The amount of deviation $\Delta$ in FIG. 6E is represented by $2 \times \lambda/2NA^2$. Consequently, the acceptable range of the generation amount of interaction image is the range of $2\lambda/2NA^2$ from the in-focus position to each of both sides of the in-focus position. $2\lambda/2NA^2$ is twice the depth of focus of the optical system. Therefore, in FIG. 6E, a high-contrast phase contrast image can be obtained when the sample has a thickness equal to or smaller than the depth of focus. Moreover, even if the sample has a thickness larger than the depth of focus, a high-contrast phase contrast image can be obtained when the thickness of the sample is within a range of twice the depth of focus.

In FIG. 6E, $r_c=0.25$. Since $r_c=r/I$, $r/I=0.25$ is derived. For this reason, in the phase contrast microscope according to the present embodiment, conditional expression (1) is satisfied. By satisfying conditional expression (1), even in the case where the thickness of the sample is thick, since it is possible to reduce the generation amount of interaction image generated at portions of the sample locate in front and behind of the in-focus position, a high-contrast phase contrast image can be obtained even if the sample is thick.

It is preferable that the following expression (1') is satisfied instead of conditional expression (1):

$$0.05 \leq r/I \leq 0.25 \tag{1'}$$

When falling below a lower limit value of conditional expression (1'), the brightness of the phase contrast observation image becomes dark. Moreover, as an example of falling below the lower limit value of conditional expression (1'), the case where phase contrast observation is performed with the light from a laser light source condensed at the pupil position of the illumination optical system is available. In such an observation, it becomes difficult to perform high-contrast observation because of the coherent noise generated by the laser light.

A phase contrast microscope according to a second embodiment includes a light source, an illumination optical system configured to irradiate an observation object with the light from the light source, and a magnifying optical system configured to magnify and project the observation object, the illumination optical system includes a ring slit, the magnifying optical system includes a phase film, the ring slit is disposed at a pupil position of the illumination optical system, the phase film is disposed at a position conjugate to the pupil position of the illumination optical system, and the following expression (2) is satisfied:

$$\beta \times R/I \leq 0.25 \tag{2}$$

where $\beta$ is a magnification in projecting the ring slit to the position of the phase film, R is a central part radius of the ring slit, and I is a radius of a pupil of the objective.

The technical meaning of conditional expression (2) is the same as that of conditional expression (1), and thus, the detailed description is omitted.

Figure 7:
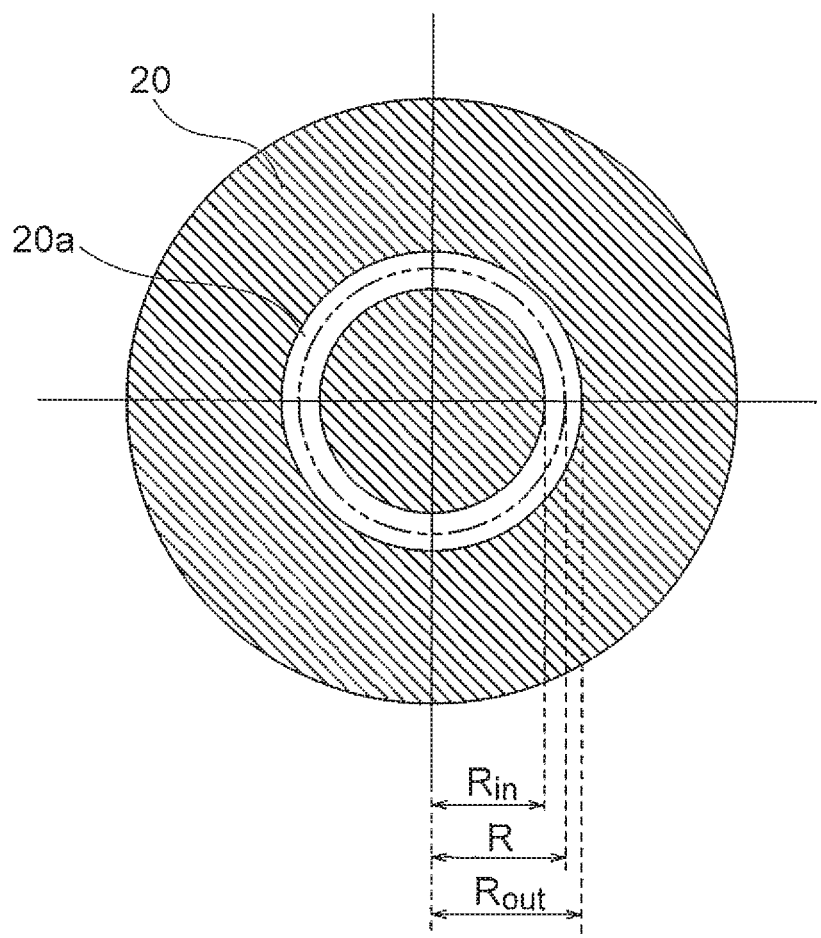
FIG. 7 is a diagram showing a radius of an aperture portion of a ring slit.

FIG. 7 is a diagram showing a radius of an aperture portion of the ring slit. The ring slit 20 has the annular aperture portion 20a. The central part radius R of the aperture portion 20a is represented by the following expression (C):

$$R=(R_{in}+R_{out})/2 \tag{C}$$

where $R_{in}$ is an inner radius of the aperture portion of the ring slit, and $R_{out}$ is an outer radius of the aperture portion of the ring slit.

When conditional expression (2) is satisfied, the image of the aperture portion in the ring slit is formed on the phase film. As in the case where conditional expression (1) is satisfied, even in the case where the thickness of the sample is thick, since it is possible to reduce the generation amount of interaction image generated by inner portions of the sample and the bottom surface of the sample, a high-contrast phase contrast image can be obtained.

It is preferable that the following expression (2') is satisfied instead of conditional expression (2):

$$0.05 \leq \beta \times R/I \leq 0.25 \tag{2'}$$

the technical meaning of the lower limit in conditional expression (2') is the same as that in conditional expression (1').

Moreover, it is preferable that the phase contrast microscope according to the first embodiment include one or more objectives satisfying conditional expression (1) and one of the objectives satisfies the following conditional expression (3):

$$3.5 < T/\{\beta \times (R_{out}-R_{in})\} < 7.5 \tag{3}$$

where

T is a film width of the phase film (see FIG. 4), $\beta$ is a magnification in projecting the ring slit to the position of the phase film, $R_{in}$ is an inner radius of the aperture portion of the ring slit, and $R_{out}$ is an outer radius of the aperture portion of the ring slit.

When a plurality of objectives satisfy conditional expression (1), the same ring slit can be used together with these objectives. In order to form a phase contrast image with any objective, the image of the aperture portion of the ring slit formed by the non-diffraction light (hereinafter referred to as the "aperture portion image") should be imaged on the phase film. However, the width of the phase film is different depending on the magnification of objective. Moreover, variation in the position and the width of the phase film occurs in the manufacturing process. Similarly, variation in the position and the width of the slit occurs in the manufacturing process.

In the phase contrast microscope, it is possible to perform phase contrast observation unless the aperture portion image is formed out of the phase film. Thus, a phase contrast image can be formed when the width of the phase film is widened in order to prevent the aperture portion image from being formed out of the phase film even if the aperture portion of the phase film or the ring slit varies due to manufacturing error. However, an unnecessarily widened width of the phase film can result in the reduction in the contrast of the phase contrast image. For this reason, it is preferable that the film width of the phase film be designed by taking into consideration the manufacturing error in a ring slit or a phase film and the reduction in the contrast of the phase contrast image.

When falling below a lower limit value of conditional expression (3), it is necessary to make manufacturing error very small. For this reason, the productivity of the phase contrast microscope will be significantly decreased.

When exceeding an upper limit value of conditional expression (3), influence of manufacturing error becomes small, but the contrast of the phase contrast image is significantly reduced.

Moreover, it is preferable that the phase contrast microscope according to the first embodiment includes a plurality of objectives, one or more objectives satisfying conditional expression (1) are included, and the objectives including the objective satisfying conditional expression (1) satisfy the conditional expression (3).

Moreover, in the phase contrast microscope according to the first embodiment, it is preferable that the objectives have a ratio of the maximum to the minimum magnification equal to or less than 10.

The phase contrast microscope includes at least one objective satisfying conditional expression (1) and includes a plurality of objectives, whereby a common ring slit can be used together with these objectives. Consequently, it is possible to improve the operating efficiency. The ratio of the maximum magnification to the minimum magnification need not be exactly 10, and about 10 is sufficient. In addition, it is preferred that the maximum magnification be 40 times and the minimum magnification be four times.

Moreover, it is preferred that the phase contrast microscopes according to the first embodiment and the second embodiment include a predetermined objective and a predetermined ring slit used together with the predetermined objective, and the ring slit and the predetermined ring slit be exchangeable.

The predetermined objective is an objective not satisfying conditional expression (1). In the predetermined objective, the position and the film width of the phase film are different from those for the objective satisfying conditional expression (1). For this reason, the predetermined objective cannot be used together with the ring slit for the objective satisfying conditional expression (1).

Thus, the predetermined ring slit, that is, a ring slit used together with the predetermined objective is prepared. In addition, the ring slit and the predetermined ring slit are configured to be exchangeable. With this configuration, it is possible to select the optimum ring slit for an objective to be used. As a result, it is possible to obtain a high-contrast phase contrast image with any objective.

Moreover, it is preferable that the phase contrast microscopes according to the first embodiment and the second embodiment include a holder, and the ring slit and the predetermined ring slit be held on the holder.

FIG. 8 is a diagram showing a holder. In FIG. 8, a slider 8 is illustrated as the holder. The slider 8 includes three holding sections. A ring slit 20 is disposed on the first holding section. A ring slit 30 is formed on the second holding section and a circular aperture portion 31 is formed on the third holding section, respectively. By moving the slider 8 in a plane orthogonal to the optical axis, it is possible to locate any one of the ring slit 20, the ring slit 30, and the aperture portion 31 in the light path.

The ring slit 20 is used together with the objective satisfying conditional expression (1). The ring slit 30 is the predetermined ring slit and is used together with the predetermined objective. The aperture portion 31 is used together with, for example, an objective for bright-field observation. With this configuration, the optimum aperture element can be selected for the objective to be used. As a result, it is possible to obtain a high-contrast phase contrast image in the phase contrast observation. Moreover, it is possible to perform other kinds of observation different from phase contrast observation.

Moreover, the objective according to the present embodiment includes a plurality of lenses and a phase film, and conditional expression (1) is satisfied:

$$r/I \leq 0.25 \quad (1)$$

where
 $r$ is a central part radius of the phase film, and
 $I$ is a radius of a pupil of the objective.

The technical meaning of conditional expression (1) has been explained, and thus the same explanation is omitted here. With conditional expression (1), even in the case where the thickness of the sample is thick, since it is possible to reduce the generation amount of interaction image generated at portions of the sample locate in front and behind of the in-focus position, a high-contrast phase contrast image can be obtained.

An example of the objectives used in the phase contrast microscope according to the present embodiment is shown in Table 1. In this example, two objectives are combined and a common ring slit is used. Moreover, one of the objectives (40× objective) satisfies conditional expression (1).

TABLE 1

|  | 4× Objective | 40× Objective |
| --- | --- | --- |
| pupil radius of objective (mm): I | 4.5 | 2.475 |
| inner radius of phase film (mm): $r_{in}$ | 2.5 | 0.35 |
| outer radius of phase film (mm): $r_{out}$ | 3.5 | 0.65 |
| inner radius of ring slit (mm): $R_{in}$ | 6.9 | 6.9 |
| outer radius of ring slit (mm): $R_{out}$ | 7.5 | 7.5 |
| magnification in projecting ring slit to the position of the phase film: β | 0.45 | 0.07 |
| conditional expression (1) | 0.67 | 0.2 |
| conditional expression (2) | 3.7 | 7.1 |

In this example, the 4× objective needs a phase film disposed outside the objective pupil; however, the depth of focus thereof becomes deeper (±27.5 μm when λ=0.55 μm and NA=0.1) because its magnification is small. Thus, as discussed above, negative influence of the defocus component is small. In contrast, for a high-magnification objective, interaction image should be taken into consideration because the depth of focus of such a lens is shallow.

Another example of the objectives used in the phase contrast microscope according to the present embodiment is shown in Table 2. In this example, three objectives are combined and a common ring slit is used. Moreover, one of the objectives (40× objective) satisfies conditional expression (1).

TABLE 2

|  | 10× Objective | 20× Objective | 40× Objective |
| --- | --- | --- | --- |
| pupil radius of objective (mm): I | 4.5 | 3.6 | 2.475 |
| inner radius of phase film (mm): $r_{in}$ | 1.2 | 0.9 | 0.35 |
| outer radius of phase film (mm): $r_{out}$ | 1.7 | 1.3 | 0.65 |
| inner radius of ring slit (mm): $R_{in}$ | 6.9 | 6.9 | 6.9 |
| outer radius of ring slit (mm): $R_{out}$ | 7.5 | 7.5 | 7.5 |
| magnification in projecting ring slit to the position of the phase film: β | 0.2 | 0.15 | 0.07 |
| conditional expression (1) | 0.32 | 0.31 | 0.2 |
| conditional expression (3) | 4.2 | 4.4 | 7.1 |

According to the phase contrast microscope of the present embodiments, a high-contrast phase contrast image can be obtained even in the case where the thickness of the sample is thick.

As described above, the present invention is suitable for a phase contrast microscope capable of obtaining a high-contrast phase contrast image even in the case where the thickness of the sample is thick.

What is claimed is:

1. A phase contrast microscope comprising:

a light source;

an illumination optical system including (i) a condenser lens and (ii) a ring slit disposed at a pupil position of the illumination optical system, the illumination optical system being configured to irradiate an observation object with light from the light source; and a magnifying optical system including (i) an objective provided with a phase film and (ii) an imaging lens, the magnifying optical system being configured to magnify and project an image of the observation object by the objective and the imaging lens, wherein the phase film is disposed at a position conjugate to the pupil position of the illumination optical system, and wherein conditional expressions (1) and (3) are satisfied:

$$r/I \leq 0.25 \quad (1),$$

$$3.5 < T/\{\beta \times (R_{out} - R_{in})\} < 7.5 \quad (3),$$

where:

r is a central part radius of the phase film,

I is a radius of a pupil of the objective,

T is a film width of the phase film,

β is a magnification in projecting the ring slit to the position of the phase film, $R_{in}$ is an inner radius of an aperture portion of the ring slit, and $R_{out}$ is an outer radius of the aperture portion the ring slit.

2. The phase contrast microscope according to claim 1, further comprising:

at least one additional objective, such that the phase contrast microscope comprises a plurality of objectives.

3. The phase contrast microscope according to claim 2, wherein a ratio of a maximum magnification among the plurality of objectives to a minimum magnification among the plurality of objectives is equal to or less than 10.

4. The phase contrast microscope according to claim 1, further comprising:

a predetermined objective; and a predetermined ring slit used together with the predetermined objective, wherein the ring slit and the predetermined ring slit are exchangeable.

5. The phase contrast microscope according to claim 4, further comprising:

a holder, wherein the ring slit and the predetermined ring slit are held on the holder.

6. The phase contrast microscope according to claim 1, wherein conditional expression (1') is satisfied:

$$0.05 \leq r/I \leq 0.25 \quad (1').$$

* * * * *